(12) United States Patent
Robbins, III

(10) Patent No.: US 6,834,846 B2
(45) Date of Patent: Dec. 28, 2004

(54) EXTRUDED FENCING AND RELATED MANUFACTURING METHOD

(76) Inventor: Edward S. Robbins, III, 128 Hazelwood La., Florence, AL (US) 35630

( * ) Notice: Subject to any disclaimer, the term of this patent is extended or adjusted under 35 U.S.C. 154(b) by 158 days.

(21) Appl. No.: 10/378,217

(22) Filed: Mar. 3, 2003

(65) Prior Publication Data

US 2004/0173786 A1 Sep. 9, 2004

(51) Int. Cl.[7] .............................................. A01K 3/00
(52) U.S. Cl. .............................. 256/10; 256/32; 256/46
(58) Field of Search ............................. 256/10, 32, 46

(56) References Cited

U.S. PATENT DOCUMENTS

| | | | |
|---|---|---|---|
| 3,366,854 A | | 1/1968 | Robinson |
| 4,162,783 A | | 7/1979 | Crist, Jr. |
| 4,465,263 A | | 8/1984 | Robbins, Jr. |
| 4,533,120 A | * | 8/1985 | Ruddock ..................... 256/52 |
| 4,684,107 A | | 8/1987 | Robbins, Jr. |
| 4,755,633 A | * | 7/1988 | Standing ........................ 256/4 |
| 4,860,996 A | | 8/1989 | Robbins, III |
| 4,881,721 A | * | 11/1989 | Manley ........................ 256/52 |
| 4,973,029 A | * | 11/1990 | Robbins, III ................. 256/10 |
| 5,096,162 A | | 3/1992 | Cleveland |
| 5,163,658 A | | 11/1992 | Cleveland |
| 5,203,542 A | * | 4/1993 | Coley et al. ................. 256/10 |
| 5,992,828 A | | 11/1999 | Burdick |
| 6,126,146 A | * | 10/2000 | Melton ........................ 256/34 |
| 6,533,881 B1 | * | 3/2003 | Wall ........................... 156/160 |

* cited by examiner

Primary Examiner—Daniel P. Stodola
Assistant Examiner—Michael P. Ferguson
(74) Attorney, Agent, or Firm—Brinks Hofer Gilson Lione

(57) ABSTRACT

Webbing for use in fencing includes a plurality of longitudinally extending and substantially vertically aligned high-tensile strength core members including at least one electrically conductive wire. A solid plastic sheath encases each of the core members and a plurality of plastic webs extends between adjacent pairs of core members. The plastic sheath, which encases the electrically conductive wire core member, includes sufficient electrically conductive filler to permit passage of electrical charges from the electrically conductive wire to an outer surface of the sheath. The plastic sheath encasing the electrically conductive wire core member can have a color contrasting with the plurality of plastic webs. The webbing outer surface has a pattern of ridges or grooves arranged to simulate a weathered wood surface.

19 Claims, 2 Drawing Sheets

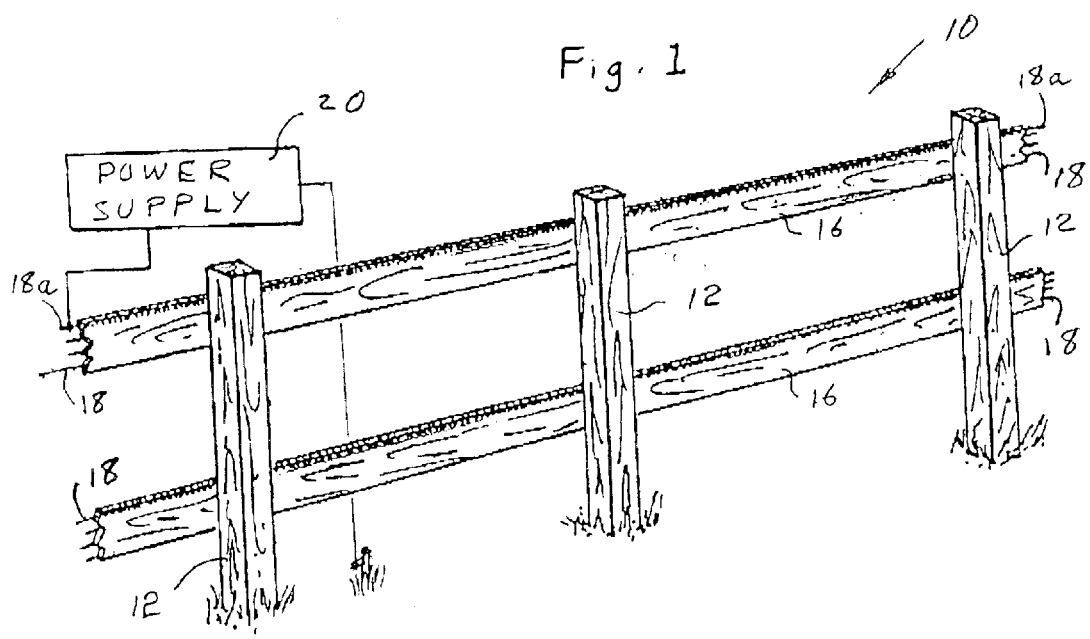
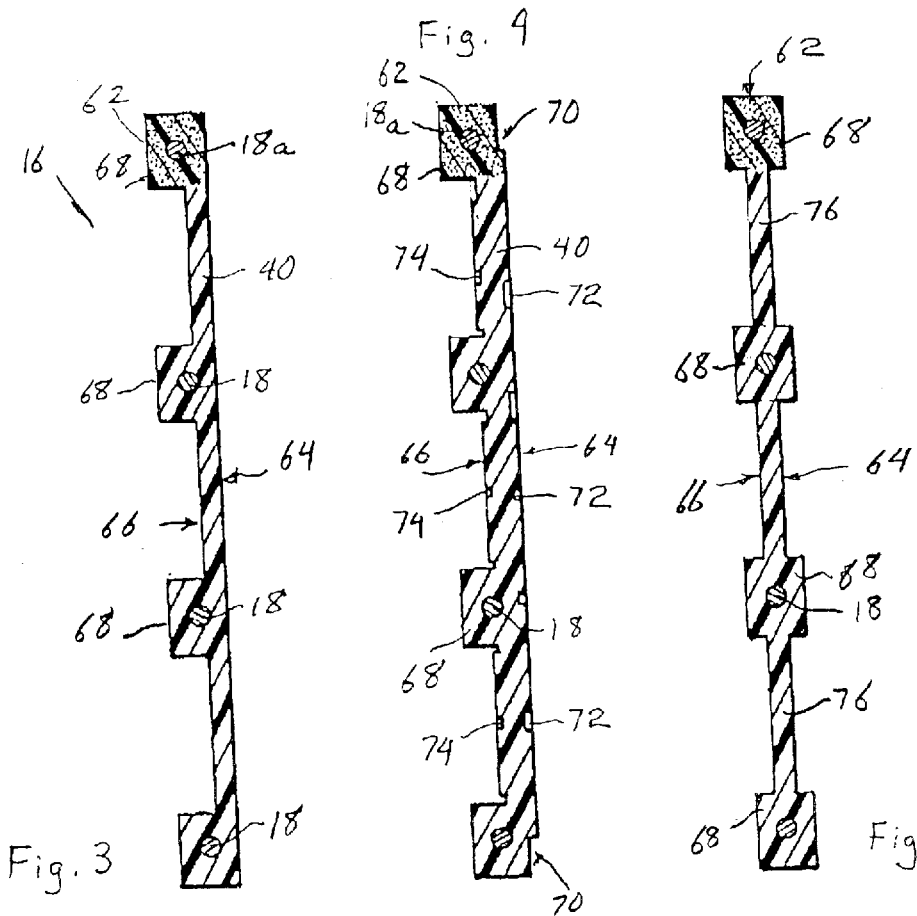

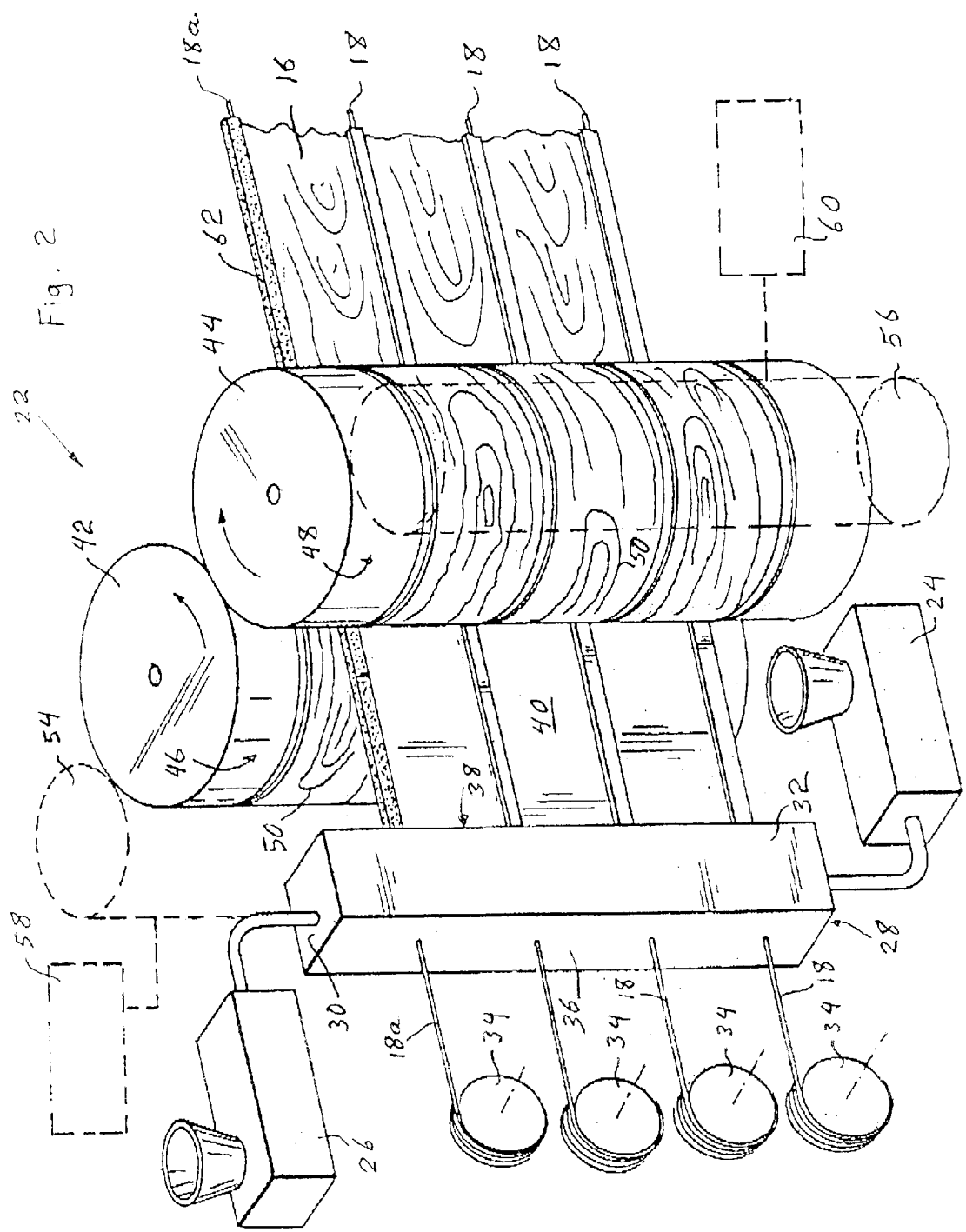

EXTRUDED FENCING AND RELATED MANUFACTURING METHOD

BACKGROUND OF THE INVENTION

This invention relates generally to fencing systems used to provide a secure enclosure for livestock, particularly horses. The present invention relates more specifically to the generally horizontal structural elements supported by a plurality of upright fence posts, and even more specifically to the incorporation of electrically conductive wires in the horizontal structural elements.

It is known to include electrically conductive wires in fence constructions for the confinement of livestock. Such systems generally include one or more electrically conductive wires. Representative examples of such systems are disclosed in U.S. Pat. Nos. 3,669,413 and 3,223,796. It has been recognized that bare wire systems, such as are disclosed in U.S. Pat. No. 3,669,413, are difficult for the livestock to see. The reaction of an animal to being shocked by such bare wire systems is unpredictable since the animal, unable to ascertain the location of the source of the shock, will often charge into a fence, rather than away from the fence, causing significant damage to the fence and injury to the animal. In addition to poor visibility, open wire systems also lack much aesthetic appeal beyond their low visibility.

It is also known to utilizing an electrically conductive wire in combination with a more visible horizontal structural element to enhance the likelihood that the animal, when shocked, will shy away from the fence. A particularly useful and more visible horizontal structural element is known to have a plurality of vertically spaced, high tensile-strength wires joined by intervening plastic webs. Representative examples of such systems are disclosed in U.S. Pat. Nos. 4,465,263; 4,864,107; 4,860,996; 4,881,721; 4,973,029; and 5,992,828. The electrically conductive wire was itself made somewhat more visible and less likely to injure an animal by coating the wire with an electrically conductive polymer to enhance the cross-sectional size of the wire. The electrically conductive wire was held in spaced relation to the webbed wire structure by special brackets designed for attachment to fence posts. While such systems provided improved performance over bare wire electrical fence systems, care had to be taken to ensure the tension in the electrically conductive wire closely matched the more visible structural elements so that the electrically conductive wire was suitably positioned. Further, from an aesthetic point of view, such systems were considered by some to be only a minor improvement over the previous bare wire systems.

There remains a need for a highly visible horizontal structural element for use in fencing that ensures the correct positioning of the electrically conductive wire. There also remains a need for a highly visible horizontal structural element for use in fencing that is aesthetically more pleasing so that it will be more readily accepted in areas having zoning regulations restricting the use of wire fencing.

SUMMARY OF THE INVENTION

In accordance with the present invention, a highly visible horizontal structural element for use in fencing is constructed as a single extruded webbing that has a plurality of longitudinally extending and substantially vertically aligned high-tensile strength core members, one of the core members comprising an electrically conductive wire. A solid plastic sheath encases each of the core members and a plurality of plastic webs extends between adjacent pairs of the core members with each of the plurality of plastic webs being joined to the plastic sheaths encasing the adjacent core members. The plastic sheath, which encases the electrically conductive wire core member, includes sufficient electrically conductive filler to permit passage of electrical charges from the electrically conductive wire to an outer surface of the sheath. The web joining the plastic sheath encasing the electrically conductive wire core member to the adjacent core member assures correct relative placement of the electrically conductive wire core member.

The webbing of the present invention can be made through the use of an extrusion mold including a plurality of inlet openings for receiving a plurality of longitudinally extending core members and an outlet opening generally having a cross-sectional shape of the webbing to be formed. A plurality of high-tensile strength core members, including a core member comprising an electrically conductive wire, are introduced into the inlet openings of the extrusion mold. At least two plasticizers or extruders of plastic are coupled to the extrusion mold to supply the plastic necessary to form the plastic sheath encasing each of the core members, and to form the plurality of plastic webs extending between adjacent pairs of the core members. The plastic extruder supplying the plastic sheath encasing the electrically conductive wire core member is supplied with a plastic including sufficient electrically conductive filler to permit passage of electrical charges through the plastic from the electrically conductive wire to an outer surface of the plastic sheath. The plastics are supplied by the plastic plasticizers at such rates that the plastic sheaths encasing the core members and the plurality of plastic webs joining the plastic sheaths are continuously formed as the core members pass through the extrusion mold and out the outlet opening.

Further, the extruded webbing of the present invention can have an outer surface that includes a pattern of ridges or grooves arranged to simulate a weathered wood surface. The patterned surface can be formed continuously with the extrusion of the webbing by embossing the pattern on the webbing by passing the extruded webbing between a pair of rollers situated adjacent to the outlet opening of the extrusion mold. At least one of the rollers is engraved with the desired pattern, which is reproduced in the webbing as it passes between the rollers. Alternatively, the patterned surface can be formed continuously with the extrusion of the webbing by etching the desired pattern on the webbing surface with a computer driven laser. The resulting pattern improves the aesthetic appeal of the webbing without detracting from its structural integrity.

Additional features and advantages of the invention are discussed below in conjunction with the illustrated preferred embodiments shown in the accompanying drawings.

BRIEF DESCRIPTION OF THE DRAWINGS

FIG. 1 is a perspective view of a fence constructed using the webbing of the present invention.

FIG. 2 is a schematic illustration of an extrusion molding operation for forming the webbing of the present invention.

FIG. 3 is a cross-sectional view of a webbing of the present invention.

FIG. 4 is a cross-sectional view of another webbing of the present invention.

FIG. 5 is a cross-sectional view of yet another webbing of the present invention.

DESCRIPTION OF THE ILLUSTRATED PREFERRED EMBODIMENTS

A fence 10 is shown in FIG. 1 to comprise a plurality of posts 12 that have a lower end buried in the ground 14. A plurality of strips of webbing 16 secured to the posts 12. The attachment mechanism can be any of a variety of brackets disclosed in the previously identified patents. The webbing strips 16 include a plurality of strands 18 that are capable of withstanding significant tension forces. The strands 18 can be formed of a high-tensile strength wire such as a conventional 12½ gage galvanized or non-galvanized steel wire. It will be understood that alternative wires can also be used, depending upon strength requirements of the fence 10, and that the number of wires can vary. Alternatively, the strands 18 can be formed of wire cable, glass fiber or synthetics such as polyester or nylon formed in mono-filament or poly-filament cords, as well as polypropylene ropes or cables. At least one of the strands 18a should be electrically conductive. A suitable power supply 20 can be connected between the electrically conductive strand 18a and the ground 14 to provide a shock that will cause reaction in, but will not harm, an animal pastured within the fence 10.

An apparatus 22 for forming a webbing strip 16 of the present invention is shown in FIG. 2. The apparatus 22 includes a first polymer supplier 24 and a second polymer supplier 26. The two polymer suppliers 24 and 26 are connected to opposite ends 28 and 30, respectively, of a cross-head extruder 32. The apparatus includes a plurality of strand suppliers 34. Each of the strand suppliers 34 supplies one of the strands 18 to an input side 36 of the cross-head extruder 32. At least one of the strands 18a should be electrically conductive. The cross-head extruder 32 includes an output side 38 opposite the input side 36 from which a co-extrusion 40 emerges, the shape of the co-extrusion being defined by the shape of an outlet opening on the output side 38. The co-extrusion 40 includes the plastics supplied by the two polymer suppliers 24 and 26 as well as the strands 18 supplied by the strand suppliers 34.

The apparatus 22 also includes at least two rolls 42 and 44 located with respect to the output side of the cross-head extruder 32 so that the co-extrusion 40 passes between the two rolls 42 and 44. The rolls 42 and 44 have cylindrical surfaces 46 and 48 that include surface features 50 imitating a wood grain pattern. The exact pattern constitutes a choice of design, but a natural wood grain pattern is particularly desirable to achieve the aesthetic appeal provided by a wood fence. Each of the cylindrical surfaces 46 and 48 can also include a plurality of cylindrical grooves 52 that can be aligned with the strands 18 included in the co-extrusion 40. The two rolls 42 and 44 are positioned with respect to each other in sufficiently close proximity as to impress the surface of the co-extrusion 40 with the wood grain pattern of the surface features 50.

The apparatus 22 can also include a pair of inking rollers 54 and 56 situated in contact with rolls 42 and 44, respectively. Suppliers 58 and 60 are coupled to the inking rollers 54 and 56 to supply ink or other coloring agent to the inking rollers. The inking rollers 54 and 56 in turn supply the ink or other coloring agent to the surface features 50 on the rolls 42 and 44. The ink or other coloring agent is then transferred to the surface of the co-extrusion 40 by contact with or impression by the surface features 50. Thus, the co-extrusion 40 gains an enhanced appearance of natural wood through a color contrast between the ink or other coloring agent and the plastics forming the co-extrusion 40. The choice of colors is not limited to any specific combination and constitutes a design choice. The apparatus 22 can also include additional rollers to control the speed of formation of the co-extrusion 40, and to direct the co-extrusion through additional process steps including cooling and coiling operations subsequent the formation.

The plastics forming the co-extrusion are supplied to the first and second suppliers 24 and 26. The first polymer supplier 24 is supplied with a plastic such as a polyvinyl chloride selected to have a surface hardness in the range of between about 90 and 94 Shore A. Other polymers having other hardness characteristics can be employed, for example, a thermoplastic polyolefin, polypropylene/rubber compositions, or other vinyl-based or other modified thermoplastic polymers. The first polymer supplier 24 is operated at such a speed as will supply a sufficient volume of the plastic to continuously fill substantially the entire cross-head extruder 32. The second polymer supplier 26 is supplied with a plastic similar to that supplied to polymer supplier 24 but also including sufficient electrically conductive filler to permit passage of electrical charges from the electrically conductive strand 18a to an outer surface 62 of the finished webbing 16. The electrically conductive filler can be carbon, particles of electrically conductive metal, or other materials that will contribute sufficient electrical conductivity to the plastic. The presence of the electrically conductive filler may introduce a visual color difference as compared with the unfilled compatible plastic. For example, the plastic that does not include the electrically conductive filler can exhibit a white or very light color, while the plastic containing the electrically conductive filler can appear as a gray or black. To diminish or eliminate this color contrast, it may be desirable to include a coloring agent in the unfilled compatible plastic so that the webbing as a whole appears to be black, brown, grey or any other desirable color of choice.

FIGS. 3–5 show three various cross-sectional shapes for the webbing 16 produced from the apparatus 22. In FIG. 3, the webbing 16 is formed to include a plurality of longitudinally extending and substantially vertically aligned high-tensile strength core members or strands 18 with at least one of the core members 18a being electrically conductive. All of the strands 18 are enclosed by a single extrusion 40 of plastic. The plastic extrusion 40 includes a first vertical surface 64 that is planar and a second vertical surface 66 that is interrupted by a series of protrusions 68. Each of the protrusions 68 encases one of the strands 18. The uppermost protrusion 68 encases the electrically conductive strand 18a with a plastic containing electrically conductive filler as previously described for allowing electrical charges from electrically conductive strand 18a to be transmitted to surface 62. One, and preferably both, of the surfaces 64 and 66 can have a surface coating of ink or other colorant that exhibits a wood grain pattern.

In FIG. 4, the webbing 16, the first vertical surface 64 is truncated at its ends by intrusions 70. The first and second vertical surfaces 64 and 66 include embossings 72 and 74 generating a series of ridges that exhibit a wood grain structure. The depth of the embossings 72 and 74 can be reflected by the depth of the end intrusions 70 so that continuous gauging of the embossing process can be easily accomplished with a roller gauge or other measuring instrument. In FIG. 5, both of the first and second vertical surfaces 64 and 66 include protrusions 68, the strands 18 being centered with respect to the web portions 76 extending between the protrusions. While the relative thickness of the various portions of the webbing 16 are subject to substantial variation, typically the thickness of the webbing through a protrusion 68 is at least twice the thickness of the web portions 76 extending between the protrusions. The vertical distance between protrusions can vary substantially, and is typically more than 5 cm.

While the apparatus 22 herein disclosed can satisfactorily create the webbing 16 of the present invention, it will be appreciated that other apparatus, such as a laser, could be employed to generate the wood grain pattern on the surface of the co-extrusion 40. Additional variations to the illustrated apparatus 22 and to the resulting 16 will be apparent to those skilled in the art as a result of the foregoing detailed description. It is therefore intended that the foregoing detailed description be regarded as illustrative rather than limiting, and that the following claims, including all equivalents, define the spirit and scope of this invention.

What is claimed is:

1. Webbing for use in fencing comprising:
   a plurality of longitudinally extending and substantially vertically aligned high-tensile strength core members, one of said core members comprising an electrically conductive wire,
   a solid plastic sheath encasing each of the core members, and
   a plastic web extending between adjacent pairs of the core members, each plastic web being formed with the plastic sheaths as a single, unitary, extruded member, encasing the adjacent core members, the plastic web and plastic sheaths defining a solid, unitary cross-section,
   the plastic sheath, which encases the electrically conductive wire core member, including sufficient electrically conductive filler to permit passage of electrical charges from the electrically conductive wire to an outer surface of the sheath, the electrically conductive filler being confined to the plastic sheath immediately surrounding the electrically conductive wire core member so that the plastic web extending between adjacent pairs of the core members is substantially free of any electrically conductive filler.

2. The webbing of claim 1 wherein an outer surface of the webbing includes a pattern of ridges arranged to simulate a weathered wood surface.

3. The webbing of claim 2 wherein the pattern of ridges simulating weathered wood on the outer surface is enhanced with a coloring agent.

4. The webbing of claim 1 wherein the plastic sheath encasing the electrically conductive wire core member has a color contrasting with the adjoining plastic web.

5. The webbing of claim 1 wherein all of the plastic in the webbing includes a coloring agent for minimizing any color difference between the plastic encasing the electrically conductive wire core member and the adjoining plastic web.

6. The webbing of any of claims 1 to 5 wherein the electrically conductive filler in the plastic sheath encasing the electrically conductive wire core member comprises carbon particles.

7. The webbing of any of claims 1 to 5 wherein the electrically conductive filler in the plastic sheath encasing the electrically conductive wire core member comprises conductive metal particles.

8. The webbing of any of claims 1 to 5 wherein the plastic sheath encasing each of the core members has a thickness of at least twice the thickness of the encased core member.

9. The webbing of any of claims 1 to 5 wherein the plastic sheath encasing each of the core members has a generally rectangular cross-section.

10. The webbing of any of claims 1 to 5 wherein the wire of the electrically conductive wire core member comprises high-tensile strength, steel wire.

11. The webbing of any of claims 1 to 5 wherein the web between each pair of adjacent plastic sheaths has a thickness less than the thickness of the encased core members.

12. The webbing of any of claims 1 to 5 wherein the web between each pair of adjacent plastic sheaths separates the adjacent plastic sheaths by a distance of at least 5 cm.

13. The webbing of any of claims 1 to 5 wherein one elongated core member comprises a synthetic or glass fiber.

14. Webbing for use in fencing comprising:
   a plurality of longitudinally extending and substantially vertically aligned high-tensile strength core members,
   a solid plastic sheath encasing each of the core members, and
   a plastic web extending between adjacent pairs of the core members, each plastic web being formed with the plastic sheaths as a single, unitary, extruded member, encasing the adjacent core members, the plastic web and plastic sheaths defining a solid, unitary cross-section, to form a substantially unitary horizontally extending structure having an out surface of the plastic web and adjoining solid plastic sheaths, the outer surfaces of the plastic web and adjoining sheaths including a pattern of ridges arranged to simulate a weathered wood surface,
   the plastic web having a composition that is different from at least one of the solid plastic sheaths encasing the core members having a composition including sufficient electrically conductive filler to permit passage of electrical charges to an outer surface of the sheath, the plastic web having a composition that is substantially free of electrically conductive filler.

15. The webbing of claim 14 wherein least one of the high-tensile strength core member comprises an electrically conductive wire member, the plastic sheath, which encases each electrically conductive wire core member, including sufficient electrically conductive filler to permit passage of electrical charges from the electrically conductive wire to an outer surface of the sheath.

16. The webbing of claim 15 wherein the plastic web is colored white and wherein the plastic sheath encasing the electrically conductive wire core member has a color contrasting with the adjoining plastic web.

17. The webbing of claim 15 wherein all of the plastic in the webbing includes a coloring agent for minimizing any color difference between the plastic encasing the electrically conductive wire core member and the adjoining plastic web.

18. The webbing of either of claim 14 or 15 wherein a plurality of the high-tensile strength core members comprises an electrically conductive wire member.

19. The webbing of either of claim 14 or 15 wherein the plurality of high-tensile strength core members consists of two such members.

* * * * *

UNITED STATES PATENT AND TRADEMARK OFFICE
CERTIFICATE OF CORRECTION

PATENT NO.   : 6,834,846 B2
DATED        : December 28, 2004
INVENTOR(S)  : Edward S. Robbins, III It is certified that error appears in the above-identified patent and that said Letters Patent is hereby corrected as shown below:

<u>Column 6,</u>
Line 38, the word -- at -- is inserted after the word "wherein" and before the word "least."

Signed and Sealed this

Twenty-sixth Day of April, 2005

JON W. DUDAS
*Director of the United States Patent and Trademark Office*